(12) United States Patent
Mukawa

(10) Patent No.: US 8,220,966 B2
(45) Date of Patent: *Jul. 17, 2012

(54) IMAGE DISPLAY APPARATUS

(75) Inventor: Hiroshi Mukawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/910,541

(22) Filed: Oct. 22, 2010

(65) Prior Publication Data

US 2011/0032706 A1    Feb. 10, 2011

Related U.S. Application Data

(63) Continuation of application No. 12/254,981, filed on Oct. 21, 2008, now Pat. No. 7,841,745.

(30) Foreign Application Priority Data

Nov. 29, 2007    (JP) ................ P2007-309045

(51) Int. Cl.
   *G02B 6/26*    (2006.01)
   *G02B 5/18*    (2006.01)
(52) U.S. Cl. .............. 362/268; 359/15; 385/31
(58) Field of Classification Search ............. 362/296.1, 362/268, 551, 559–561; 385/31; 359/15–17, 359/34; 353/33, 81
   See application file for complete search history.

(56) References Cited

U.S. PATENT DOCUMENTS

| 5,076,664 | A | 12/1991 | Migozzi |
| 5,453,877 | A | 9/1995 | Gerbe et al. |
| 7,418,170 | B2 | 8/2008 | Mukawa et al. |
| 7,453,012 | B2 | 11/2008 | Bocquenet et al. |
| 7,502,168 | B2 | 3/2009 | Akutsu et al. |
| 7,710,655 | B2 * | 5/2010 | Freeman et al. ............... 359/636 |
| 7,841,745 | B2 * | 11/2010 | Mukawa ....................... 362/268 |
| 2004/0233488 | A1 | 11/2004 | Kasai et al. |
| 2005/0180687 | A1 | 8/2005 | Amitai |

(Continued)

FOREIGN PATENT DOCUMENTS

EP    1498765 A1    1/2005

(Continued)

OTHER PUBLICATIONS

European Search Report issued Sep. 8, 2011, for corresponding European Appln. No. 08253535.2.

(Continued)

*Primary Examiner* — Bao Q Truong
(74) *Attorney, Agent, or Firm* — K&L Gates LLP

(57) ABSTRACT

An image display apparatus includes an image forming device having pixels; a collimating optical system collimating light from the image forming device; and an optical device receiving, guiding, and outputting the collimated light as directional rays in different directions. The optical device includes a light-guiding plate; a first optical member reflecting or diffracting the light so as to totally reflect the light inside the light-guiding plate; and a second optical member causing the propagated light to emerge from the light-guiding plate. When a light ray emitted from a pixel located farthest from the center of the image forming device and a light ray emitted from a pixel located at the center of the image forming device pass through a front nodal point of the collimating optical system and are respectively incident on the collimating optical system and the light-guiding plate at angles $\theta_1$ and $\theta_2$, $\theta_2 > \theta_1$ is satisfied.

4 Claims, 12 Drawing Sheets

U.S. PATENT DOCUMENTS

| | | |
|---|---|---|
| 2006/0228073 A1* | 10/2006 | Mukawa et al. ........... 385/31 |
| 2006/0291021 A1 | 12/2006 | Mukawa |
| 2007/0008624 A1* | 1/2007 | Hirayama ................ 359/630 |
| 2007/0070504 A1 | 3/2007 | Akutsu et al. |
| 2007/0070859 A1 | 3/2007 | Hirayama |
| 2007/0217017 A1 | 9/2007 | Ichikawa |
| 2008/0158685 A1 | 7/2008 | Amitai |

FOREIGN PATENT DOCUMENTS

| | | |
|---|---|---|
| JP | 2005-521099 | 7/2005 |
| JP | 2006-162767 | 6/2006 |

OTHER PUBLICATIONS

European Patent Office, Communication pursuant to Article 94(3) EPC, issued in connection with European Patent Application No. 08 253 535.2, dated on Oct. 12, 2011. (6 pages).

* cited by examiner $\theta_2 = \theta_1$ $\theta_2 > \theta_1$ $\theta_2 = \theta_1$ $\theta_2 > \theta_1$

IMAGE DISPLAY APPARATUS

CROSS REFERENCES TO RELATED APPLICATIONS

The present application is a continuation of U.S. application Ser. No. 12/254,981 filed Oct. 21, 2008, which claims priority to Japanese Patent Application JP 2007-309045 filed on Nov. 29, 2007, the entire contents of which are incorporated herein by reference.

BACKGROUND

The present application relates to image display apparatuses used for enabling an observer to observe a two-dimensional image formed by an image forming device or the like.

There are some virtual image display apparatuses (image display apparatuses) each enabling an observer to observe a two-dimensional image formed by an image forming device in a form of a virtual image enlarged by a virtual optical system, as disclosed in Japanese Unexamined Patent Application Publication (Translation of PCT Application) No. 2005-521099 and Japanese Unexamined Patent Application Publication No. 2006-162767, for example.

FIG. 11 shows a conceptual diagram of an exemplary image display apparatus 410. The image display apparatus 410 includes an image forming device 411 having a plurality of pixels arranged in a two-dimensional matrix, a collimating optical system 412 collimating light emitted from the pixels of the image forming device 411, and an optical device 20 receiving the light collimated by the collimating optical system 412 into a plurality of directional rays traveling in different directions, guiding the light therethrough, and outputting the light. The optical device 20 includes a light-guiding plate 21 propagating thereinside the light received thereby with total reflection and outputting the propagated light, a first optical member 30 (a layer of reflective film, for example) reflecting the light received by the light-guiding plate 21 so as to cause the light received by the light-guiding plate 21 to be totally reflected inside the light-guiding plate 21, and a second optical member 40 (a multilayer reflective film, for example, in which a number of films are stacked) causing the light propagated with total reflection inside the light-guiding plate 21 to emerge from the light-guiding plate 21. Apparatuses, such as head-mounted displays (HMDs), that includes the image display apparatus 410 having the above-described configuration can be made lighter and smaller.

SUMMARY

The image display apparatus 410 of the related art is designed such that center light ray CL emitted from the center of the image forming device 411 and passing through a nodal points of the collimating optical system 412 near to the image forming device 411 (hereinafter also referred to as the "front nodal point") perpendicularly strikes the light-guiding plate 21, that is, the center light ray CL emitted from the center of the image forming device 411 and passing through the front nodal point of the collimating optical system 412 is incident on the light-guiding plate 21 at zero degrees. Although an antireflective film (not shown) is provided on the plane of incidence of the light-guiding plate 21, referring to a conceptual diagram shown in FIG. 12, part of the light (denoted as A in FIG. 12, for example) incident on the light-guiding plate 21 may be reflected (as denoted by B in FIG. 12) at the plane of incidence of the light-guiding plate 21 and may be fed back to the collimating optical system 412 and further to the image forming device 411.

Let us assume that the right part of the image forming device 411 shown in FIG. 12 displays a "white" image and the left part displays a "black" image. In this case, part of the "white" image may be reflected at the plane of incidence of the light-guiding plate 21 and may be incident on the left part of the image forming device 411 displaying the "black" image. Such a phenomenon may ultimately result in a reduction in image contrast. More specifically, let us assume that the right part of the image forming device 411 displays an image with a light quantity of 100, for example, and the left part displays an image with a light quantity of 4, for example. If the image displayed on the right part of the image forming device 411 is reflected by at plane of incidence of the light-guiding plate 21 and an image with a light quantity of 0.4 is fed back to the image forming device 411, a kind of ghost image with a light quantity of 0.4 appears on the left part of the image forming device 411. The brightness of the ghost image is equivalent to 10% of the light quantity of 4 of the image that should be displayed.

In light of the above, it is desirable to provide an image display apparatus in which none of the light that is emitted from an image forming device, is transmitted through a collimating optical system, and is incident on a light-guiding plate is fed back to the image forming device.

According to a first or second embodiment of the present application, there is provided an image display apparatus including the following elements:

(A) an image forming device having a plurality of pixels arranged in a two-dimensional matrix;

(B) a collimating optical system collimating light emitted from the pixels of the image forming device; and (C) an optical device receiving the light collimated by the collimating optical system into a plurality of directional rays in different traveling directions, guiding the light therethrough, and outputting the light, where, the optical device includes the following elements:

(a) a light-guiding plate propagating thereinside the light received thereby with total reflection and outputting the propagated light;

(b) a first optical member reflecting or diffracting the light received by the light-guiding plate so as to cause the light received by the light-guiding plate to be totally reflected inside the light-guiding plate; and (c) a second optical member causing the light propagated with total reflection inside the light-guiding plate to emerge from the light-guiding plate.

In the image display apparatus according to the first embodiment, when the light emitted from a pixel located farthest from the center of the image forming device and passing through a nodal point of the collimating optical system near to the image forming device (the front nodal point) is incident on the collimating optical system at an angle of $\theta_1$, and when the light emitted from a pixel located at the center of the image forming device and passing through the nodal point of the collimating optical system near to the image forming device (the front nodal point) is incident on the light-guiding plate at an angle of $\theta_2$, a condition of $\theta_2 > \theta_1$ is satisfied.

Further, an optical baseline optically extending through the center of the image forming device and the front nodal point of the collimating optical system is not parallel to a normal to the light-guiding plate at the intersection of the optical baseline and the plane of incidence of the light-guiding plate. Therefore, the light emitted from a pixel located farthest from the center of the image forming device, passing through the collimating optical system, and striking the light-guiding plate is reflected by the light-guiding plate in a direction away from the image forming device.

In the image display apparatus according to the second embodiment, the light emitted from every pixel of the image forming device and collimated by the collimating optical system into a directional ray incident on the light-guiding plate is obliquely angled with respect to a normal to the plane of incidence of the light-guiding plate.

Further, in the image display apparatus according to the second embodiment, it is preferable that the light emitted from every pixel of the image forming device and collimated by the collimating optical system into a directional ray have a portion thereof reflected, if any, at the plane of incidence of the light-guiding plate in a direction away from the image forming device.

As a matter of convenience, the image display apparatus according to the first or second embodiment including the preferable configuration described above (hereinafter also generally referred to as simply "the image display apparatus of the present application") will be described on the basis of the following denotations: a normal to the plane of incidence of the light-guiding plate that extends through the origin defined at the center of the first optical member and takes positive values in a direction toward the collimating optical system is denoted as an $X_i$ axis, an axis of the light-guiding plate that extends through the origin while being orthogonal to the $X_i$ axis and takes positive values in a direction toward the second optical member is denoted as a $Y_i$ axis, a light ray that is emitted from a pixel located farthest from the center of the image forming device and near to the second optical member and passes through the front nodal point of the collimating optical system is denoted as a "near-end-pixel ray", a light ray that is emitted from a pixel located farthest from the center of the image forming device and away from the second optical member and passes through the front nodal point of the collimating optical system is denoted as a "far-end-pixel ray", and a light ray that is emitted from the pixel located at the center of the image forming device and passes through the front nodal point of the collimating optical system is denoted as a "center light ray".

In the image display apparatus according to the first embodiment, it can also be said that the angle formed between the $Y_i$ axis or an axis parallel to the $Y_i$ axis and the near-end-pixel ray or the far-end-pixel ray is an acute angle, or that the angle formed between the $Y_i$ axis or an axis parallel to the $Y_i$ axis and the far-end-pixel ray or the near-end-pixel ray is an obtuse angle. On the other hand, in the image display apparatus according to the second embodiment, it can also be said that the center light ray is optically parallel to or not optically parallel to an $X_iY_i$ plane while being acutely or obtusely intersects with an $X_iZ_i$ plane. That is, the center light ray is incident on the light-guiding plate at an (acute) angle from a side near to the second optical member or at an (obtuse) angle from a side away from the second optical member.

The image display apparatus according to the first embodiment may be configured in such a manner that the light ray emitted from a pixel located farthest along an axis corresponding to the $Y_i$ axis from the center of the image forming device and passing through the front nodal point of the collimating optical system is incident on the collimating optical system at an angle of $\theta_1$.

In the image display apparatus of an embodiment, the optical axis of the collimating optical system may optically extend through the center of the image forming device. In this case, the optical axis of the collimating optical system coincides with the optical baseline. In some cases, the center of the image forming device may or may not lie on the extension of the optical axis of the collimating optical system. In the case where the center of the image forming device does not lie on the extension of the optical axis of the collimating optical system, the collimating optical system can be configured in such a manner that the optical axis thereof extends through the center of the image forming device via other optical systems. For this reason, it is described that the optical axis of the collimating optical system "optically" extends through the center of the image forming device. This also applies to the other parts in the specification. Further, in the image display apparatus of the present application, the optical axis of the collimating optical system may be parallel to a normal to a plane of incidence of the light-guiding plate, the normal extending through the center of the first optical member, while the optical axis of the collimating optical system may optically extend through a point away from the center of the image forming device.

There are several image forming devices suitable for the image display apparatus of the present application including the preferable configurations described above, such as an image forming device including a reflective spatial light modulator and a light source; an image forming device including a transmissive spatial light modulator and a light source; and an image forming device including light-emitting elements such as organic electroluminescence (EL) elements, inorganic EL elements, and light-emitting diodes (LEDs). In particular, it is preferable that the image forming device include a reflective spatial light modulator and a light source. Exemplary spatial light modulators include a light valve, such as a transmissive liquid crystal display or a reflective liquid crystal display employing a technique of liquid-crystal-on-silicon (LCOS), and a digital micromirror device (DMD). Exemplary light sources include a light-emitting element. Further, the reflective spatial light modulator may include a liquid crystal display and a polarization beam splitter, the polarization beam splitter reflecting part of light emitted from the light source and guiding the part of light to the liquid crystal display while transmitting part of light reflected by the liquid crystal display and guiding the part of light to the collimating optical system. Exemplary light-emitting elements that can be included in the light source include a red-light-emitting element, a green-light-emitting element, a blue-light-emitting element, and a white-light-emitting element. The light-emitting element may be a semiconductor laser element or an LED. The number of pixels included in the image forming device may be determined in accordance with the relevant specifications of the image display apparatus. For example, the number of pixels may be any of the following: 320×240, 432×240, 640×480, 1024×768, and 1920×1080.

In the image display apparatus of the present application, the light collimated by the collimating optical system into a plurality of directional rays in different traveling directions is made to be incident on the light-guiding plate. The light takes the form of directional rays because it is important that optical wavefront information at the time of incidence of such light on the light-guiding plate is retained even after the light is reflected by the first and second optical members and are output from the light-guiding plate. Specifically, a plurality of directional rays traveling in different directions can be generated by disposing the image forming device at a distance from the collimating optical system corresponding to the focal length of the collimating optical system. The collimating optical system has a function of converting information on the light emitted from the image forming device from information indicating the positions of the pixels in the image forming device into information indicating the angles of the directional rays in the optical system of the optical device. Further, since the collimating optical system collimates the light emitted from the image forming device into a plurality of directional rays traveling in different directions, the light received by the light-guiding plate in the form of plurality of directional rays traveling in different directions are output from the light-guiding plate after being propagated thereinside with total reflection. The first optical member reflects or diffracts the directional rays received by the light-guiding plate so as to cause the directional rays to be totally reflected inside the light-guiding plate. The second optical member also reflects or diffracts the directional rays propagated with total reflection inside the light-guiding plate and causes the directional rays to emerge from the light-guiding plate.

In the image display apparatus of the present application, the light-guiding plate has two surfaces (a first surface and a second surface) parallel to each other along, for example, the axis (the $Y_i$ axis) of the light-guiding plate. Here, when a surface of the light-guiding plate from which the light emerges is referred to as the plane of emergence, the first surface may include both the plane of incidence and the plane of emergence. Alternatively, the first surface may include the plane of incidence and the second surface may include the plane of emergence.

The first optical member is made of metal including alloy, for example, and can be configured as a reflective film (a kind of mirror) reflecting the light received by the light-guiding plate, or a diffraction grating (such as a hologram diffraction grating film) diffracting the light received by the light-guiding plate. The second optical member can be configured as a multilayer structure in which a number of dielectric films are stacked, a half mirror, a polarization beam splitter, or a hologram diffraction grating film. It is preferable that the first and second optical members be incorporated in, i.e., be provided inside, the light-guiding plate. Alternatively, the first and second optical members may be fixed to the first and/or second surfaces of the light-guiding plate.

Exemplary materials for the light-guiding plate include the following: glass including optical glass such as fused quartz and BK7; and plastic materials including polymethylmethacrylate (PMMA), polycarbonate resin, acrylic resin, non-crystalline polypropylene resin, and styrenic resin such as acrylonitrile-styrene (AS) resin. The shape of the light-guiding plate is not limited to a flat shape, and may be a curved shape.

The collimating optical system included in the image display apparatus of the present application may be any of optical systems including one of or a combination of a convex lens, a concave lens, a free-form-surface prism, and a hologram lens, as long as the optical system generally has a positive optical power.

With the image display apparatus of the present application, an HMD can be provided, for example, with a reduced weight and a reduced size. Accordingly, discomfort in wearing such an apparatus can be largely reduced. Moreover, the manufacturing cost can be reduced.

Exemplary configurations of an image forming device or the light source having light-emitting elements and light valves include the following, other than a combination of a backlight generally emitting white light and a liquid crystal display having red-light-emitting pixels, green-light-emitting pixels, and blue-light-emitting pixels.

(Image Forming Device A)

An image forming device A, which is a field-sequential color image forming device, includes the following elements:

(α) a first image forming unit including a first light-emitting panel, the first light-emitting panel having first light-emitting elements that emit blue light and are arranged in a two-dimensional matrix;

(β) a second image forming unit including a second light-emitting panel, the second light-emitting panel having second light-emitting elements that emit green light and are arranged in a two-dimensional matrix;

(γ) a third image forming unit including a third light-emitting panel, the third light-emitting panel having third light-emitting elements that emit red light and are arranged in a two-dimensional matrix; and (δ) means (a dichroic prism, for example, as in other image forming devices described below) for integrating the light emitted from the first, second, and third image forming units into light propagating along a single optical path, where the image forming device controls the individual emission/non-emission states of the first, second and third light-emitting elements.

(Image Forming Device B)

An image forming device B, which is also a field-sequential color image forming device, includes the following elements:

(α) a first image forming unit including a first light-emitting panel having first light-emitting elements that emit blue light and are arranged in a two-dimensional matrix, and a blue-light-transmission controller (a light valve) controlling whether or not to allow transmission of the light emitted from the first light-emitting panel;

(β) a second image forming unit including a second light-emitting panel having second light-emitting elements that emit green light and are arranged in a two-dimensional matrix, and a green-light-transmission controller (a light valve) controlling whether or not to allow transmission of the light emitted from the second light-emitting panel;

(γ) a third image forming unit including a third light-emitting panel having third light-emitting elements that emit red light and are arranged in a two-dimensional matrix, and a red-light-transmission controller (a light valve) controlling whether or not to allow transmission of the light emitted from the third light-emitting panel; and (δ) means for integrating the light transmitted through the blue-, green-, and red-light-transmission controllers into light propagating along a single optical path, where the image forming device displays an image by controlling with the light-transmission controllers (light valves) whether or not to allow transmission of the light emitted from the individual first, second, and third light-emitting panels.

(Image Forming Device C)

An image forming device C, which is also a field-sequential color image forming device, includes the following elements:

(α) a first image forming unit including a first light-emitting panel having first light-emitting elements that emit blue light and are arranged in a two-dimensional matrix;

(β) a second image forming unit including a second light-emitting panel having second light-emitting elements that emit green light and are arranged in a two-dimensional matrix;

(γ) a third image forming unit including a third light-emitting panel having third light-emitting elements that emit red light and are arranged in a two-dimensional matrix;

(δ) means for integrating the light emitted from the first, second, and third image forming units into light propagating along a single optical path; and (∈) a light-transmission controller (a light valve) controlling whether or not to allow transmission of the light emitted from the means for integrating the light along a single optical path, where the image forming device displays an image by controlling with the light-transmission controller whether or not to allow transmission of the light emitted from the light-emitting panels.

(Image Forming Device D)

An image forming device D, which is also a field-sequential color image forming device, includes a light-transmission controller (a light valve) controlling whether or not to allow transmission of light emitted from light-emitting-element units arranged in a two-dimensional matrix. The image forming device D displays an image by controlling the individual emission/non-emission states of first light-emitting elements, second light-emitting elements, and third light-emitting elements included in the respective light-emitting-element units in a time-shared manner and by controlling with the light-transmission controller whether or not to allow transmission of the light emitted from the individual first, second, and third light-emitting elements.

In the image display apparatus according to the first embodiment of the present application, a condition of $\theta_2 > \theta_1$ is satisfied, and the optical baseline is not parallel to a normal to the light-guiding plate at the intersection of the optical baseline and the light-guiding plate. In the image display apparatus according to the second embodiment of the present application, the light emitted from every pixel of the image forming device and collimated by the collimating optical system into a directional ray incident on the light-guiding plate is obliquely angled with respect to the normal to the plane of incidence of the light-guiding plate. Accordingly, the light emitted from the image forming device, transmitted through the collimating optical system, and striking the light-guiding plate is reflected by the light-guiding plate in a direction away from the image forming device. Therefore, no ghost image appears on the image forming device. Consequently, image contrast can be improved and high-quality images can be displayed on the image forming device.

Additional features and advantages are described herein, and will be apparent from the following Detailed Description and the figures.

DETAILED DESCRIPTION

Figure 1:
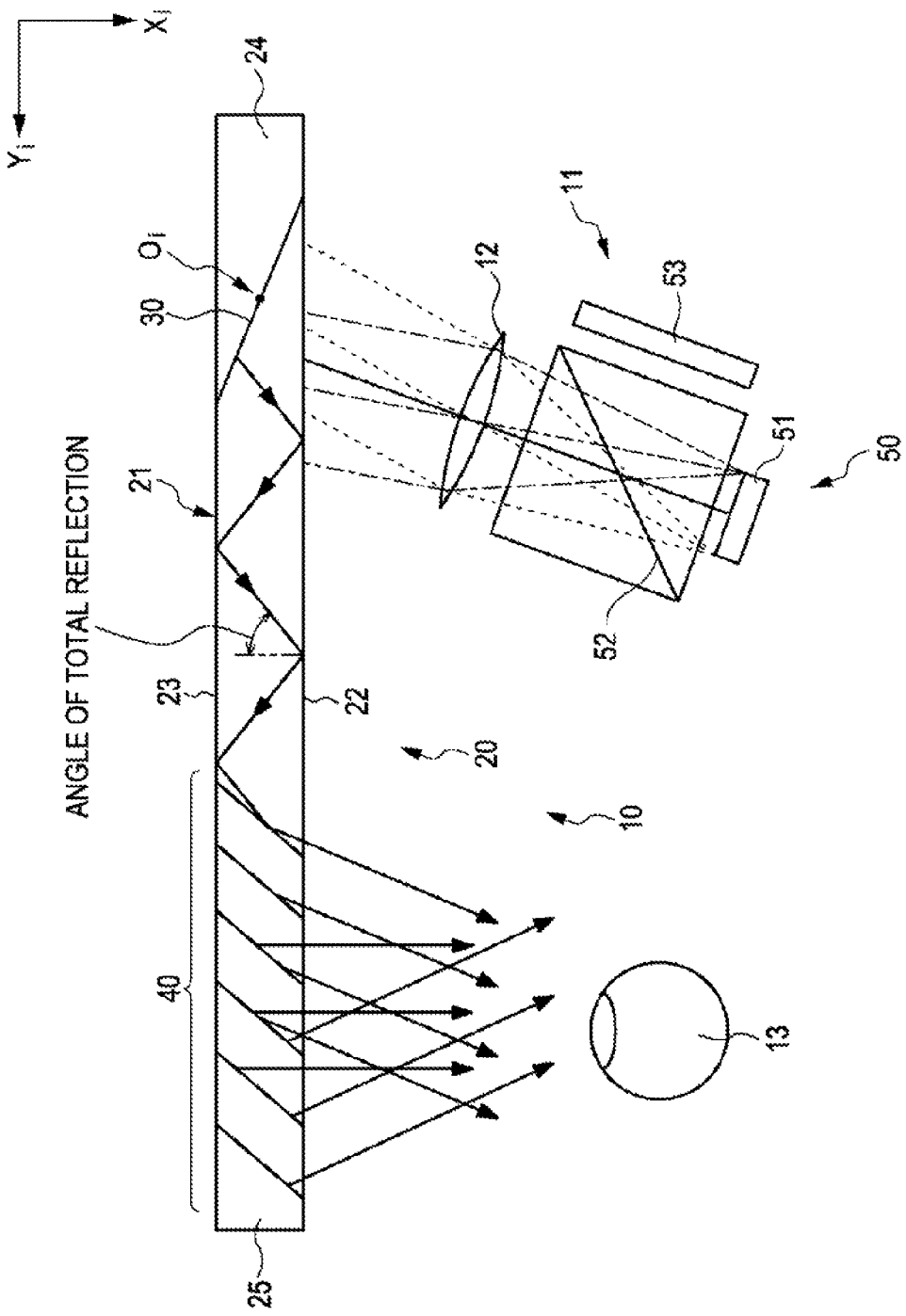
FIG. 1 is a conceptual diagram of an image display apparatus of Example 1.

An embodiment of the present application will now be described with reference to specific examples, referring to the drawings.

Example 1

Example 1 relates to the image display apparatuses according to the first and second embodiments. FIG. 1 is a conceptual diagram of an image display apparatus 10 of Example 1. The image display apparatus 10 includes the following elements:

(A) an image forming device 11 having a plurality of pixels arranged in a two-dimensional matrix;

(B) a collimating optical system 12 collimating light emitted from the pixels of the image forming device 11; and (C) an optical device 20 receiving the light collimated by the collimating optical system 12 into a plurality of directional rays in different traveling directions, guiding the light therethrough, and outputting the light. The optical device 20 includes the following elements:

(a) a light-guiding plate 21 propagating thereinside the light (specifically, the plurality of directional rays in different traveling directions) received thereby with total reflection and outputting the propagated light;

(b) a first optical member 30 reflecting (in Example 1) or diffracting the light (the plurality of directional rays) received by the light-guiding plate 21 so as to cause the light (the plurality of directional rays) received by the light-guiding plate 21 to be totally reflected inside the light-guiding plate 21; and (c) a second optical member 40 causing the light (the plurality of directional rays) propagated with total reflection inside the light-guiding plate 21 to emerge (specifically, to emerge while maintaining the form of the plurality of directional rays) from the light-guiding plate 21. The light that has emerged from the light-guiding plate 21 travels toward and is incident on a pupil (the position of a pupil) 13 of an observer (an image observer).

In Example 1, or in Examples 2 and 3 described below, the first optical member 30 is a reflective film (a kind of mirror) made of metal (specifically, aluminum) and is incorporated in the light-guiding plate 21. Further, the second optical member 40 has a multilayer structure including a number of dielectric films and is incorporated in the light-guiding plate 21. The dielectric films are composed as films of $TiO_2$ as a high-dielectric-constant material and $SiO_2$ as a low-dielectric-constant material, for example. An exemplary multilayer structure in which a number of dielectric films are stacked is disclosed in Japanese Unexamined Patent Application Publication (Translation of PCT Application) No. 2005-521099. Although the second optical member 40 shown in the drawings is a member including six layers of dielectric films, the second optical member 40 is not limited thereto. There are provided thin pieces composed of the same material as that of the light-guiding plate 21 between the dielectric films.

The first optical member 30 can be obtained in the following manner: A portion 24 of the light-guiding plate 21 that is to be the base of the first optical member 30 is cut off into a shape having a sloping surface on which the first optical member 30 is to be provided. Then, after a reflective film is formed on the sloping surface by vacuum deposition, the portion 24 is bonded back to the light-guiding plate 21. The second optical member 40 can be obtained in the following manner: First, a multilayer structure in which thin pieces made of the same material as that of the light-guiding plate 21 (glass, for example) and dielectric films (obtained by vacuum deposition, for example) are alternately stacked is manufactured. A portion 25 of the light-guiding plate 21 at which the second optical member 40 is to be provided is cut off into a shape having a sloping surface. Then, after the multilayer structure is bonded onto the sloping surface, the outer shape of the resulting structure is adjusted by polishing or the like. Thus, the optical device 20 in which the first optical member 30 and the second optical member 40 are incorporated can be obtained.

In Example 1, or in Example 2 described below, the image forming device 11 includes a reflective spatial light modulator 50 and a light source 53 having a light-emitting diode that emits white light. More specifically, the reflective spatial light modulator 50 includes a liquid crystal display (LCD) 51 that is of an LCOS device serving as a light valve, and a polarization beam splitter 52 that reflects part of the light emitted from the light source 53 and guides the part of the light to the liquid crystal display 51 while transmitting part of the light reflected by the liquid crystal display 51 and guiding the part of the light to the collimating optical system 12. The polarization beam splitter 52 has the same configuration as those of related-art polarization beam splitters. The light emitted as unpolarized light from the light source 53 strikes the polarization beam splitter 52. The polarization beam splitter 52 transmits and outputs p-polarized components to the outside of its system, whereas the polarization beam splitter 52 reflects s-polarized components. The reflected s-polarized components enter the liquid crystal display 51, are reflected thereinside, and are output to the outside thereof. Among the light that is output from the liquid crystal display 51, light that is output from pixels displaying "white" contain a relatively large number of p-polarized components, and light that is output from pixels displaying "black" contain a relatively large number of s-polarized components. That is, among the light that strikes the polarization beam splitter 52 after being output from the liquid crystal display 51, p-polarized components are transmitted through the polarization beam splitter 52 and are guided toward the collimating optical system 12, while s-polarized components are reflected by the polarization beam splitter 52 and are fed back to the light source 53. The liquid crystal display 51 includes a plurality of pixels (J pixels per row along the $Y_i$ axis and K pixels per column along the $Z_i$ axis: J×K=320×240 pixels, for example, with the number of liquid crystal cells being three times larger than the number of pixels) that are arranged in a pattern such as a two-dimensional matrix. The collimating optical system 12 is a convex lens, for example. The image forming device 11 (more specifically, the liquid crystal display 51) is positioned at a distance from the collimating optical system 12 corresponding to the focal length of the collimating optical system 12 so that a plurality of directional rays in different traveling directions are generated by the collimating optical system 12. A single pixel includes a red-light-emitting subpixel that emits red light, a green-light-emitting subpixel that emits green light, and a blue-light-emitting subpixel that emits blue light.

In Example 1, or in Examples 2 and 3 described below, the light-guiding plate 21 has two surfaces (a first surface 22 and a second surface 23) parallel to each other along the axis of the light-guiding plate 21. The $X_i$ axis is a normal to the plane of incidence of the light-guiding plate 21 that extends through the origin ($O_i$) defined at the center of the first optical member 30 and takes positive values in a direction toward the collimating optical system 12. The first surface 22 and the second surface 23 are positioned opposite each other. The light, in the form of directional rays, enters the light-guiding plate 21 through the first surface 22, serving as the plane of incidence, is propagated with total reflection inside the light-guiding plate 21, and emerges through the first surface 22, serving as the plane of emergence. Another configuration may be employed. For example, the second surface 23 may serve as the plane of incidence, and the first surface 22 may serve as the plane of emergence.

Figure 2A:
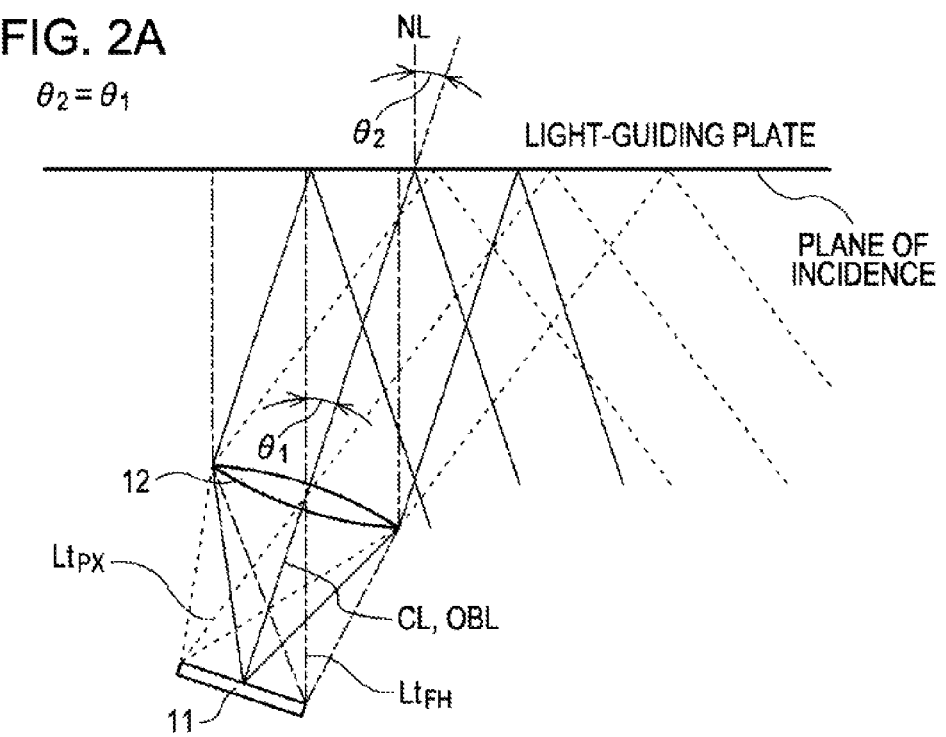
FIGS. 2A and 2B schematically show the behavior of light emitted from an image forming device, transmitted through a collimating optical system, and striking a light-guiding plate, in the image display apparatus of Example 1.
Figure 2B:
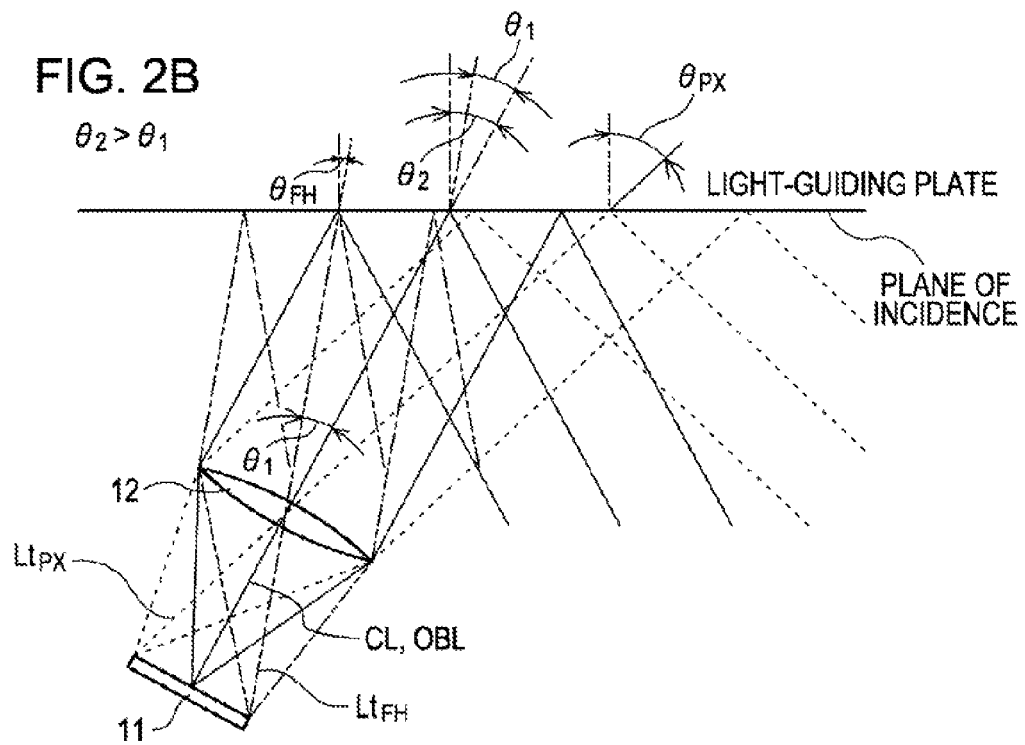

FIGS. 2A and 2B each schematically show the behavior of light emitted from the image forming device 11, transmitted through the collimating optical system 12, and striking the light-guiding plate 21. In the image display apparatus 10 of Example 1, referring to FIGS. 2A and 2B, a light ray emitted from a pixel located farthest from the center of the image forming device 11 and passing through the front nodal point of the collimating optical system 12 is incident on the collimating optical system 12 at an angle $\theta_1$, and a light ray emitted from the pixel located at the center of the image forming device 11 and passing through the front nodal point of the collimating optical system 12 (the center light ray CL) is incident on the light-guiding plate 21 at an angle $\theta_2$. Here, a condition of $\theta_2 > \theta_1$ is satisfied. In Example 1, or in Examples 2 and 3 described below, it is defined that the light ray emitted from the pixel located farthest along an axis corresponding to the $Y_i$ axis from the center of the image forming device 11 and passing through the front nodal point of the collimating optical system 12 is incident on the collimating optical system 12 at an angle of $\theta_1$, and that the center light ray CL emitted from the pixel located at the center of the image forming device 11 and passing through the front nodal point of the collimating optical system 12 is incident on the light-guiding plate 21 at an angle of $\theta_2$. Other definitions (settings) of these angles $\theta_1$ and $\theta_2$ may be employed. Further, in the image display apparatus 10 of Example 1, an optical baseline OBL optically extending through the center of the image forming device 11 and the front nodal point of the collimating optical system 12 is not parallel to a normal (shown in the two-dot chain line NL) to the light-guiding plate 21 at the intersection of the optical baseline OBL and the plane of incidence of the light-guiding plate 21. That is, the optical baseline OBL and the normal NL form a predetermined angle therebetween. Therefore, the light ray emitted from the pixel located farthest from the center of the image forming device 11, passing through the collimating optical system 12, and striking the light-guiding plate 21 is reflected by the light-guiding plate 21 in a direction away from the image forming device 11. In short, the angle formed between the optical baseline OBL and the normal NL is set in such a manner that the light emitted from the pixel located farthest from the center of the image forming device 11, passing through the collimating optical system 12, and striking the light-guiding plate 21 is reflected by the light-guiding plate 21 in a direction away from the image forming device 11. For reference, FIG. 2A shows a case of $\theta_2 = \theta_1$, and FIG. 2B shows a case of $\theta_2 > \theta_1$. Further, in the image display apparatus 10 of Example 1, the light emitted from every pixel of the image forming device 11 and collimated by the collimating optical system 12 into a directional ray incident on the light-guiding plate is not parallel to the normal to the plane of incidence (the first surface 22) of the light-guiding plate 21. Furthermore, the light emitted from every pixel of the image forming device 11 and collimated by the collimating optical system 12 into a directional ray has a portion thereof reflected, if any, at the plane of incidence (the first surface 22) of the light-guiding plate 21 in a direction in which the portion of the directional ray is not incident on the image forming device 11.

Specifically, the following settings are made in Example 1:
$\theta_1$=8 degrees
$\theta_2$=10 degrees In the image display apparatus 10 of Example 1, a near-end-pixel ray $Lt_{PX}$ and the $Y_i$ axis form an acute angle therebetween. The near-end-pixel ray $Lt_{PX}$ denotes the light ray that is emitted from the pixel located farthest from the center of the image forming device 11, or the center of the liquid crystal display 51 in Example 1, (i.e., in Example 1, the pixel located on an axis corresponding to the $Y_i$ axis farthest from the center of the image forming device 11) and near to the second optical member 40 and, at the same time, passes through the front nodal point of the collimating optical system 12. Specifically, the aforementioned acute angle is expressed as [90−($\theta_2$+$\theta_1$)] degrees. The center light ray CL is optically parallel to an $X_iY_i$ plane while intersecting an $X_iZ_i$ plane at the angle $\theta_2$. That is, the center light ray CL is incident on the light-guiding plate 21 at an acute angle from a side near to the second optical member 40. In Example 1, or in Examples 2 and 3 described below, the near-side-pixel ray $Lt_{PX}$, the center light ray CL, and a far-end-pixel ray $Lt_{FH}$ described below, are contained in the $X_iY_i$ plane. In another case, however, the near-side-pixel ray $Lt_{PX}$, the center light ray CL, and the far-end-pixel ray $Lt_{FH}$ may be not contained in the $X_iY_i$ plane. In the latter case, the angles $\theta_1$ and $\theta_2$ may be treated as solid angles.

In Example 1, or in Example 2 described below, the optical axis of the collimating optical system 12 optically extends through the center of the image forming device 11. In Example 1, the center of the image forming device 11, or the center of the liquid crystal display 51, lies on the extension of the optical axis of the collimating optical system 12. Another configuration may be employed. For example, the optical axis of the collimating optical system 12 may optically extend through the center of the image forming device 11, or the center of the liquid crystal display 51, via other optical systems, or the light propagated along the optical axis of the collimating optical system 12 may be incident from the collimating optical system 12 either directly on the light-guiding plate 21 or via other optical systems.

The observer may wear two image display apparatuses as a pair, one for the right eye and the other for the left eye, or may wear a single image display apparatus on one eye. In the case where two image display apparatuses are worn, both image display apparatuses for the right and left eyes may display the same image or may display different images (for example, images that can be composed into a three-dimensional image). In such cases, each image display apparatus functions as an HMD.

The light, in the form of directional rays, that has entered the light-guiding plate 21 and has struck the first optical member 30 is reflected by the first optical member 30 and is propagated with total reflection inside the light-guiding plate 21. The state of propagation of the directional light in the light-guiding plate 21 varies with positions on the image forming device 11 from which the light is emitted. For example, as shown in FIGS. 2A and 2B, the angle of incidence ($\theta_{PX}$) of the near-end-pixel ray $Lt_{PX}$ on the light-guiding plate 21 is larger than the angle of incidence ($\theta_{FH}$) of the far-end-pixel ray $Lt_{FH}$ on the light-guiding plate 21. The far-end-pixel ray $Lt_{FH}$ denotes the ray that is emitted from the pixel located farthest from the center of the image forming device 11, or the center of the liquid crystal display 51 in Example 1, (i.e., in Example 1, the pixel located on an axis corresponding to the $Y_i$ axis farthest from the center of the image forming device 11) and away from the second optical member 40 and, at the same time, passes through the front nodal point of the collimating optical system 12. Accordingly, the angle of total reflection of the near-end-pixel ray $Lt_{PX}$ occurring in the light-guiding plate 21 is smaller than that of the total reflection of the far-end-pixel ray $Lt_{FH}$ occurring in the light-guiding plate 21. The angle of total reflection of the center light ray CL occurring in the light-guiding plate 21 is an intermediate value between the foregoing two.

The second optical member 40 has a multilayer structure in which a number of dielectric films are stacked. Whether the light propagated inside the light-guiding plate 21 and striking the dielectric films is transmitted through the dielectric films or is reflected by the dielectric films and is output to the outside of the light-guiding plate 21 is determined by the angle at which the light strikes the dielectric films. Thus, the light emitted from the second optical member 40 reaches the pupil 13 of the observer, whereby the light can be recognized as an image. Moreover, with such a configuration, the thickness of the light-guiding plate 21 can be reduced.

In the image display apparatus 10 of Example 1, the condition of $\theta_2 > \theta_1$ is satisfied, and the optical baseline OBL is not parallel to the normal to the light-guiding plate 21 extending from the intersection of the optical baseline OBL and the light-guiding plate 21. Specifically, the optical baseline OBL and the normal form the angle $\theta_2$ therebetween. Further, the light emitted from every pixel of the image forming device 11 and collimated by the collimating optical system 12 into a directional ray incident on the light-guiding plate 21 is not parallel to the normal to the plane of incidence (the first surface 22) of the light-guiding plate 21. This means that every ray (for example, the far-end-pixel ray $Lt_{FH}$) emitted from the image forming device 11, collimated by the collimating optical system 12, and striking the light-guiding plate 21 is reflected, if any, at the plane of incidence (the first surface 22) of the light-guiding plate 21 in a direction away from the image forming device 11. Therefore, no ghost image is formed on the image forming device 11. Consequently, image contrast can be improved and high-quality images can be displayed on the image forming device 11.

Example 2

Figure 3:
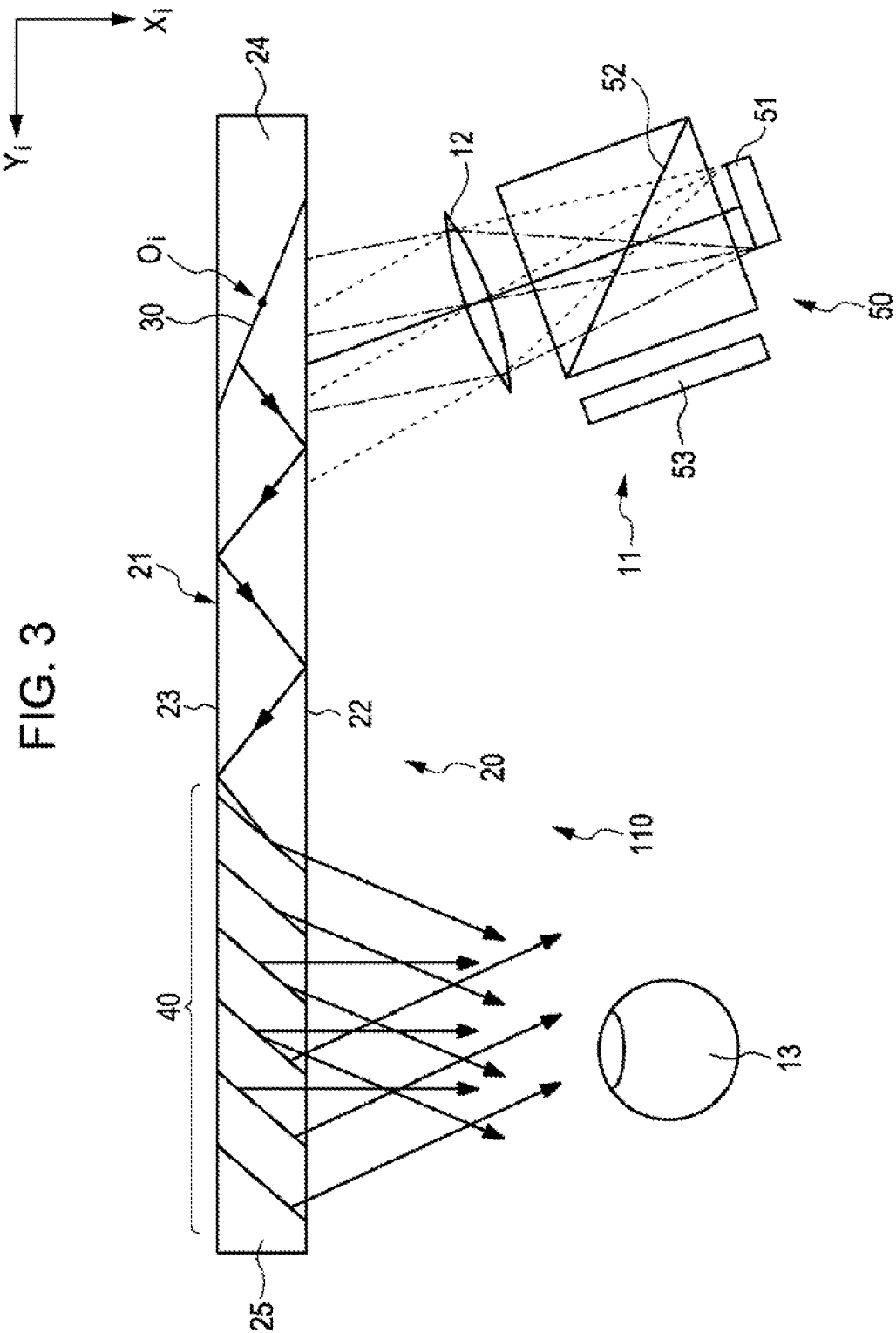
FIG. 3 is a conceptual diagram of an image display apparatus of Example 2.
Figure 4A:
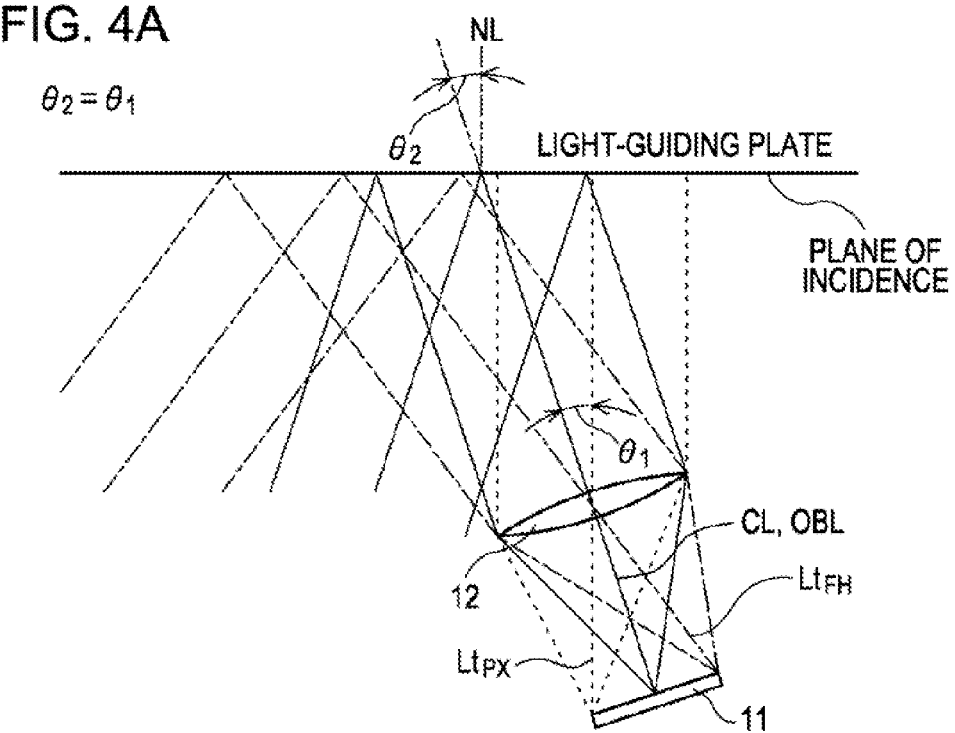
FIGS. 4A and 4B schematically show the behavior of light emitted from an image forming device, transmitted through a collimating optical system, and striking a light-guiding plate, in the image display apparatus of Example 2.
Figure 4B:
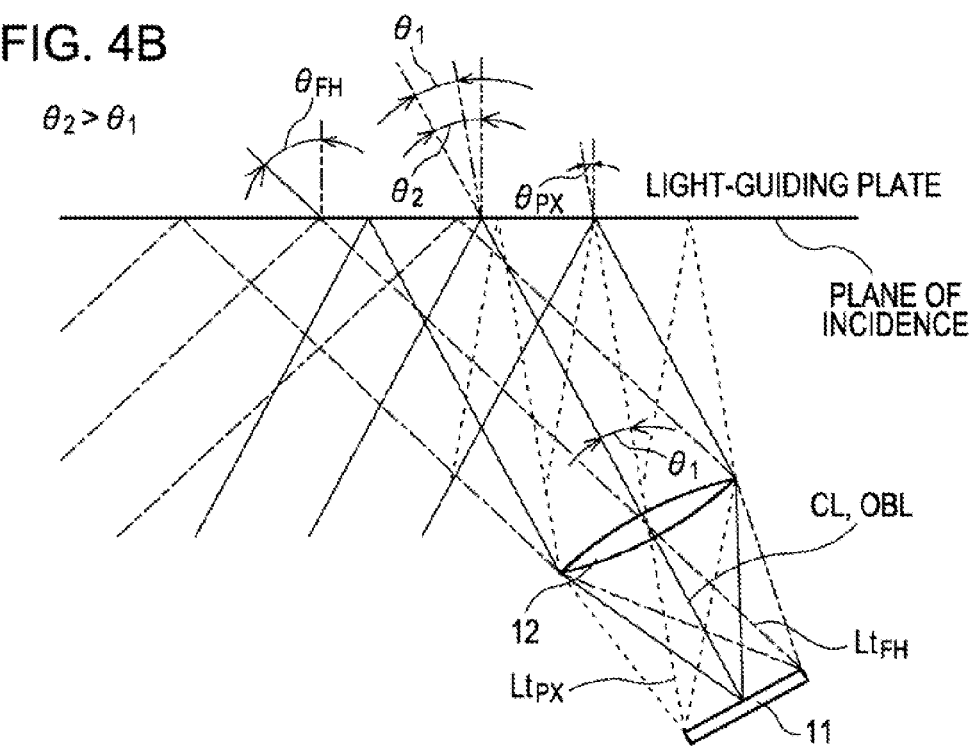

Example 2 is a modification of Example 1. FIG. 3 is a conceptual diagram of an image display apparatus 110 of Example 2. FIGS. 4A and 4B each schematically show the behavior of light emitted from the image forming device 11, transmitted through the collimating optical system 12, and striking the light-guiding plate 21. The image display apparatus 110 of Example 2 also satisfies the condition of $\theta_2 > \theta_1$. For reference, FIG. 4A shows a case of $\theta_2 = \theta_1$, and FIG. 4B shows a case of $\theta_2 > \theta_1$. The angles $\theta_1$ and $\theta_2$ in Example 2 are set to the same values as those in Example 1. However, in the image display apparatus 110 of Example 2, the far-end-pixel ray $Lt_{FH}$ and the $Y_i$ axis intersects at an obtuse angle. Specifically, this obtuse angle is expressed as [90+($\theta_2$−$\theta_1$)] degrees. The center light ray CL is optically parallel to the $X_iY_i$ plane while intersecting the $X_iZ_i$ plane at the angle $\theta_2$. That is, the center light ray CL is incident on the light-guiding plate 21 at an obtuse angle from a side away from the second optical member 40.

The image display apparatus 110 of Example 2 can be configured in the same manner as in the case of the image display apparatus 10 of Example 1, except the arrangement of the image forming device described above. Hence, detailed description of the image display apparatus 110 will be omitted.

Also in the image display apparatus 110 of Example 2, the condition of $\theta_2 > \theta_1$ is satisfied, and the optical baseline OBL is not parallel to the normal to the light-guiding plate 21 extending from the intersection of the optical baseline OBL and the light-guiding plate 21. Specifically, the optical baseline OBL and the normal form the angle $\theta_2$ therebetween. Further, the light emitted from every pixel of the image forming device 11 and collimated by the collimating optical system 12 into a directional ray incident on the light-guiding plate 21 is not parallel to the normal to the plane of incidence (the first surface 22) of the light-guiding plate 21. This means that every ray (for example, the near-end-pixel ray $Lt_{PX}$) emitted from the image forming device 11, collimated by the collimating optical system 12, and striking the light-guiding plate 21 is reflected, if any, at the plane of incidence (the first surface 22) of the light-guiding plate 21 in a direction away from the image forming device 11. Therefore, no ghost image is formed on the image forming device 11. Consequently, image contrast can be improved and high-quality images can be displayed on the image forming device 11.

Example 3

Figure 5:
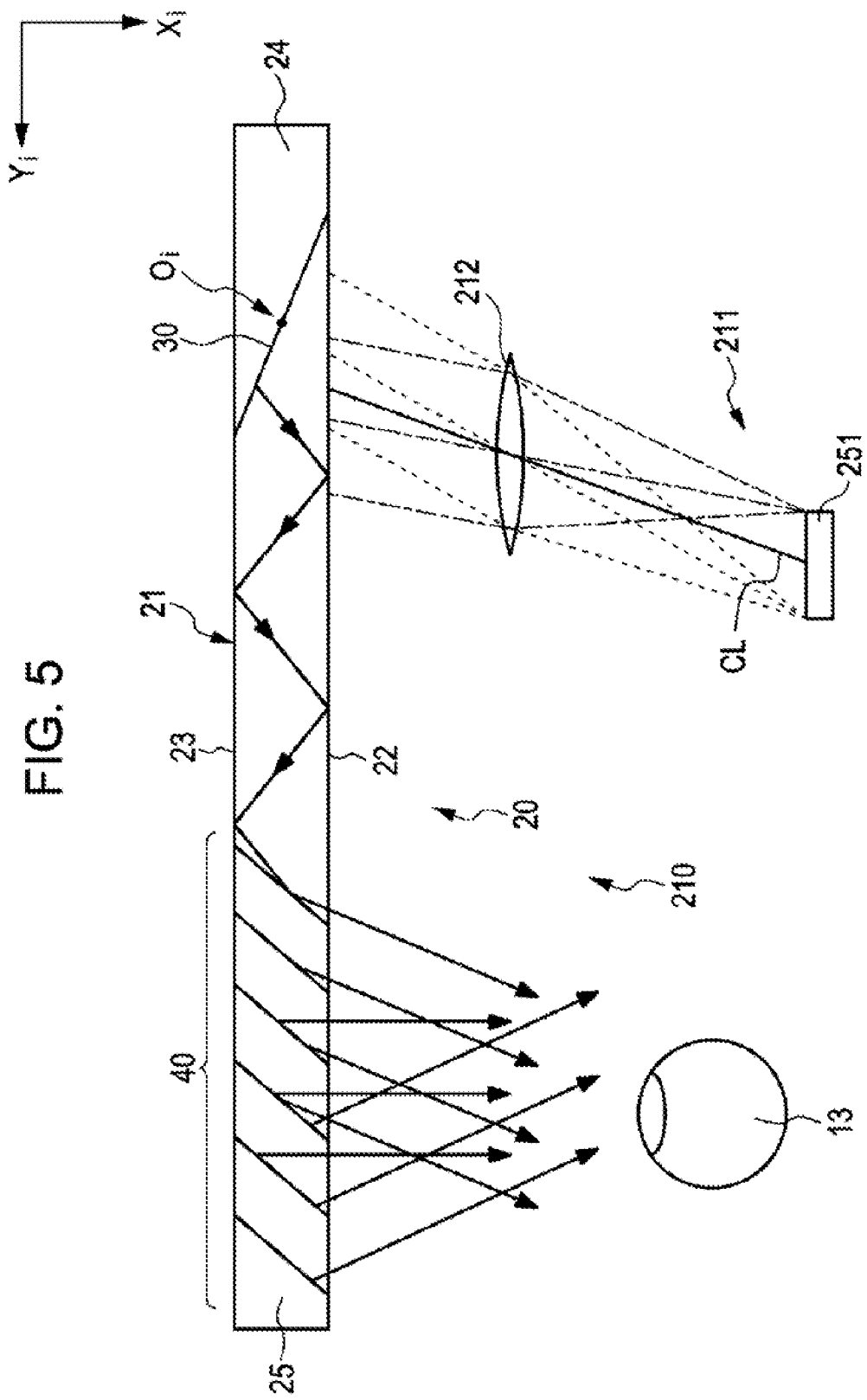
FIG. 5 is a conceptual diagram of an image display apparatus of Example 3.
Figure 6:
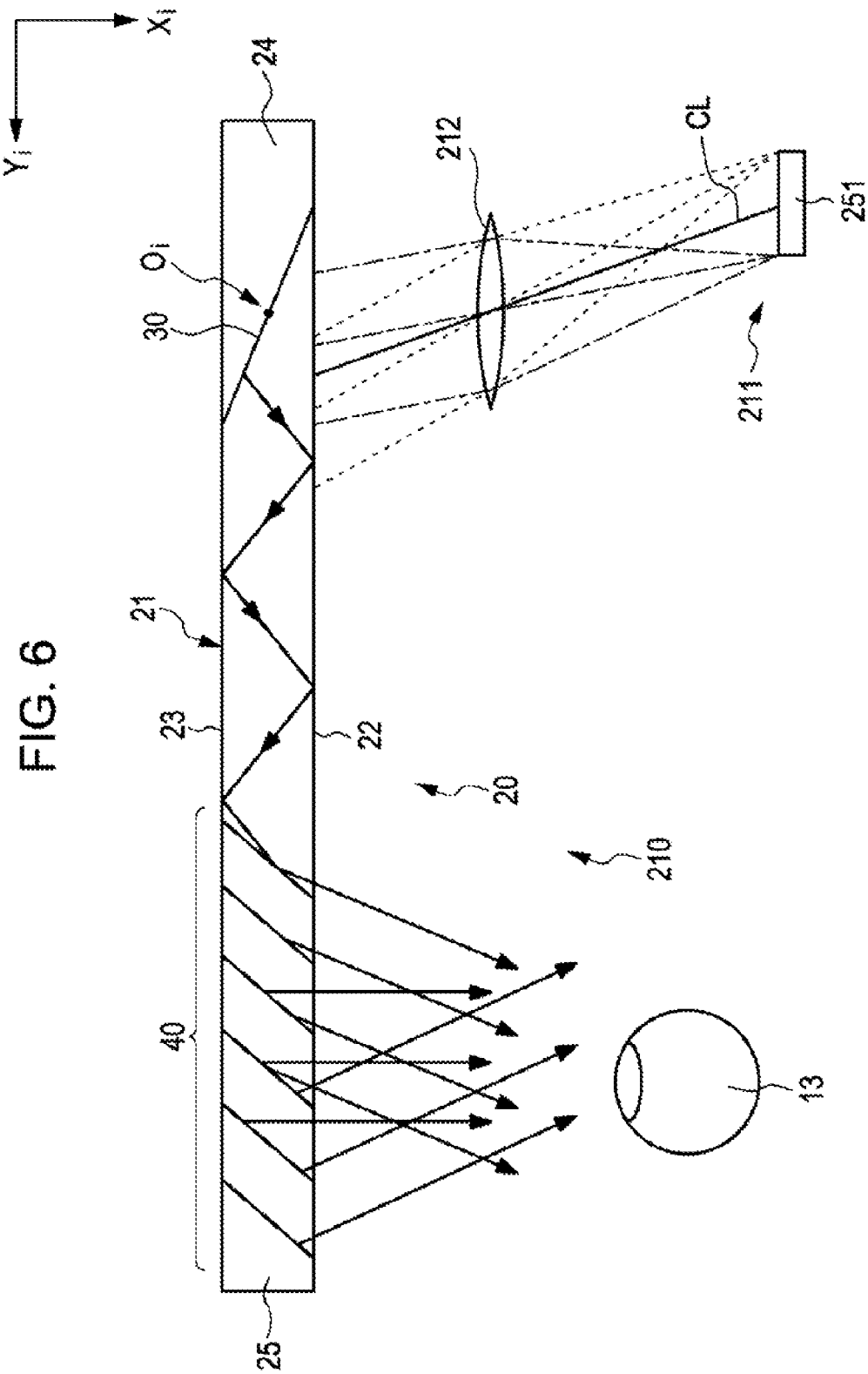
FIG. 6 is a conceptual diagram of a modification of the image display apparatus of Example 3.

Example 3 is a modification of Example 1 or Example 2. FIGS. 5 and 6 are conceptual diagrams of an image display apparatus 210 of Example 3, showing modifications of Example 1 and Example 2, respectively. In the image display apparatus 210 shown in FIGS. 5 and 6, the optical axis of a collimating optical system 212 is parallel to the $X_i$ axis. The optical axis of the collimating optical system 212 optically extends through a point away from the center of an image forming device 211, or the center of a liquid crystal display 251. With such a configuration, the center light ray CL is made to be optically parallel to the $X_iY_i$ plane while intersecting the $X_iZ_i$ plane at an acute or obtuse angle. Specifically, the angles $\theta_1$ and $\theta_2$ in Example 3 are set to the same values as those in Example 1 or 2. The liquid crystal display 251 of Example 3 is a transmissive liquid crystal display.

The image display apparatus 210 of Example 3 can be configured in the same manner as in the case of the image display apparatus of Example 1 or 2, except the arrangement described above. Hence, detailed description of the image display apparatus 210 will be omitted.

While the present application has been described on the basis of preferred examples, the present application is not limited thereto. The configurations of the image display apparatuses described above are only exemplary, and appropriate modifications can be made thereto.

Figure 7:
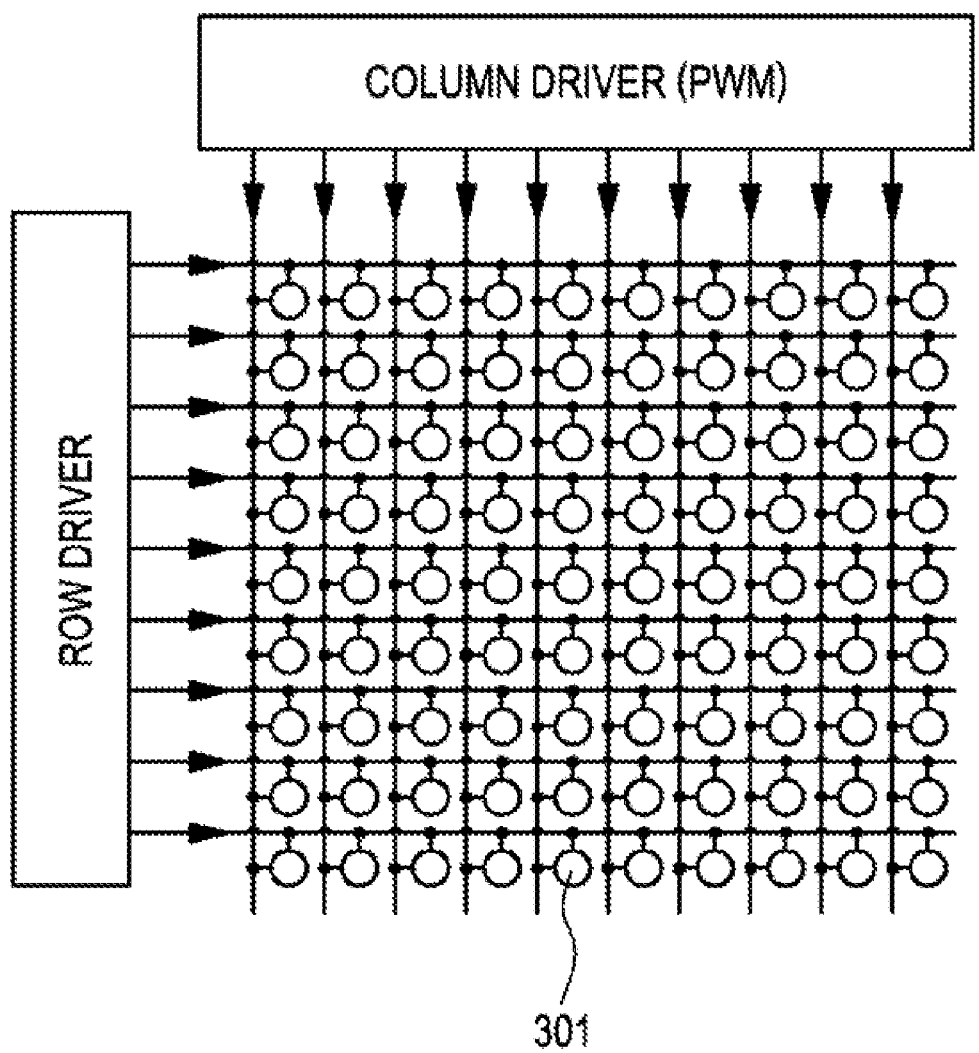
FIG. 7 is a conceptual diagram showing an exemplary image forming device suitably modified for use in Examples.

FIG. 7 is a conceptual diagram of another exemplary image forming device modified so as to be suitable for use in Examples described above. This image forming device includes a light-emitting panel having light-emitting elements 301, which are semiconductor light-emitting elements, arranged in a two-dimensional matrix. The image forming device serves as an active matrix image forming device, which displays an image by controlling the individual emission/non-emission states of the light-emitting elements 301 and having the observer directly observe the emission states of the light-emitting elements 301. The light emitted from this image forming device is transmitted through the collimating optical system 12 or 212 and is incident on the light-guiding plate 21.

Figure 8:
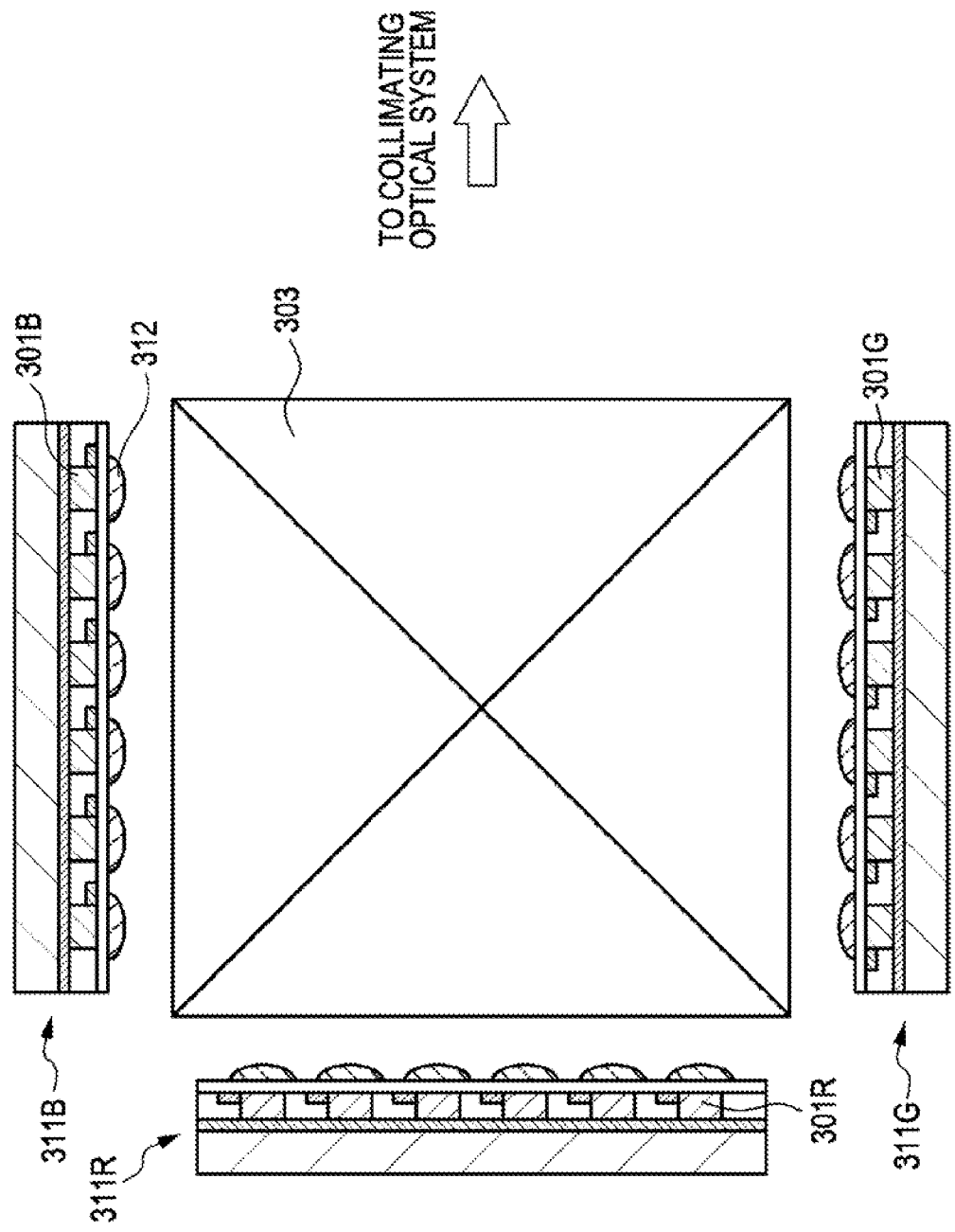
FIG. 8 is a conceptual diagram showing a modification of the exemplary image forming device.

FIG. 8 is a conceptual diagram of a color image forming device, another exemplary modification, including the following elements:

(α) a red-light-emitting panel 311R having red-light-emitting elements 301R that emit red light and are arranged in a two-dimensional matrix;

(β) a green-light-emitting panel 311G having green-light-emitting elements 301G that emit green light and are arranged in a two-dimensional matrix;

(γ) a blue-light-emitting panel 311B having blue-light-emitting elements 301B that emit blue light and are arranged in a two-dimensional matrix; and (δ) means (a dichroic prism 303, for example) for integrating the light emitted from the red-light-emitting panel 311R, the green-light-emitting panel 311G, and the blue-light-emitting panel 311B into light propagating along a single optical path, where the color image forming device controls the individual emission/non-emission states of the red-light-emitting elements 301R, the green-light-emitting elements 301G, and the blue-light-emitting elements 301B. The light emitted from this image forming device is also transmitted through the collimating optical system 12 or 212 and is incident on the light-guiding plate 21. The image forming device also includes microlenses 312 that collect the light emitted from the light-emitting elements.

Figure 9:
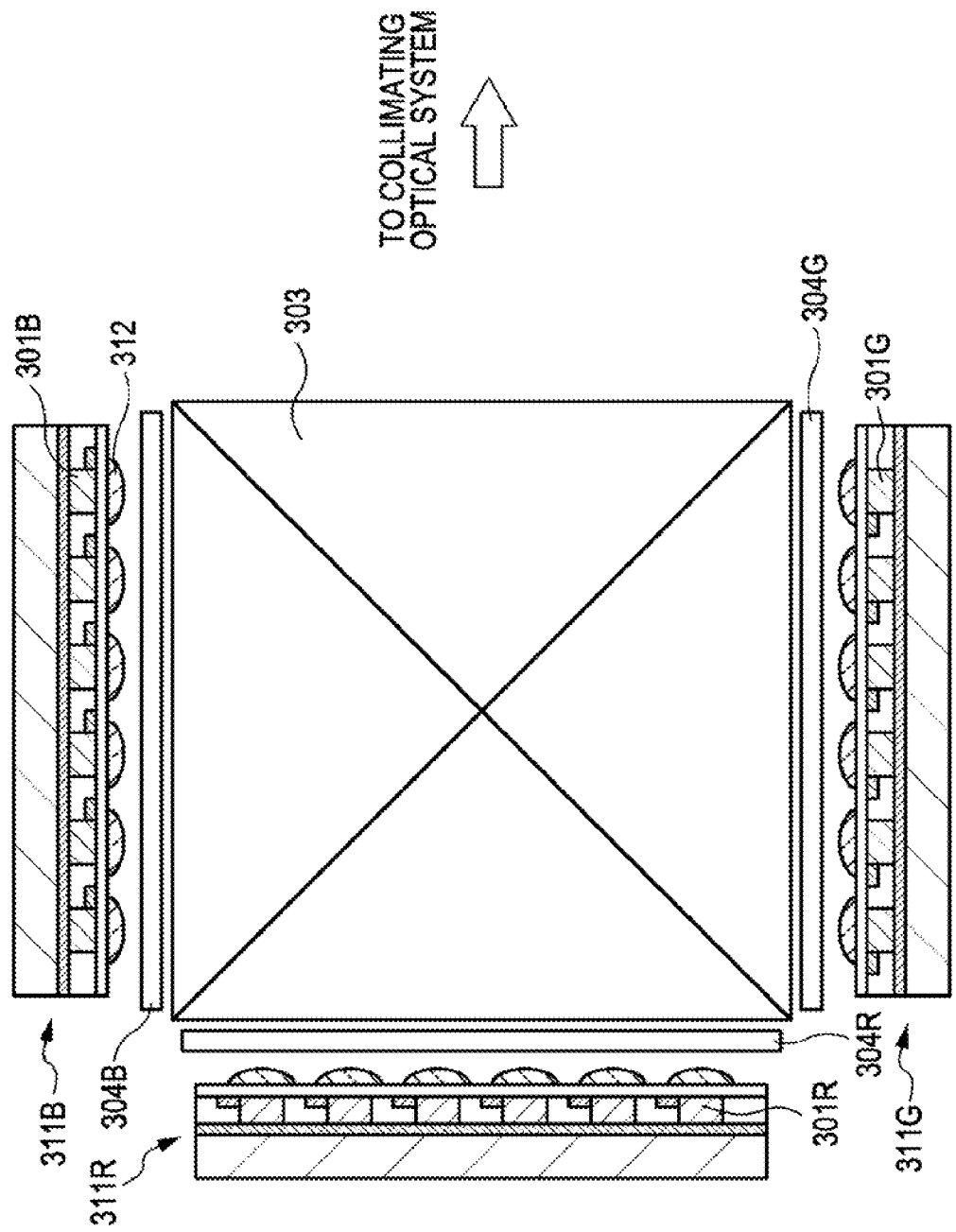
FIG. 9 is a conceptual diagram showing another modification of the exemplary image forming device.

FIG. 9 is a conceptual diagram of another image forming device including the light-emitting panels 311R, 311G, and 311B having the light-emitting elements 301R, 301G, and 301B, respectively, arranged in a two-dimensional matrix, and so forth. The light emitted from the light-emitting panels 311R, 311G, and 311B is controlled by light transmission controllers 304R, 304G, and 304B to be transmitted therethrough or to be blocked thereby. The light transmitted through the light transmission controllers 304R, 304G, and 304B enters the dichroic prism 303, is integrated into light propagating along a single optical path, is transmitted through the collimating optical system 12 or 212, and is incident on the light-guiding plate 21.

Figure 10:
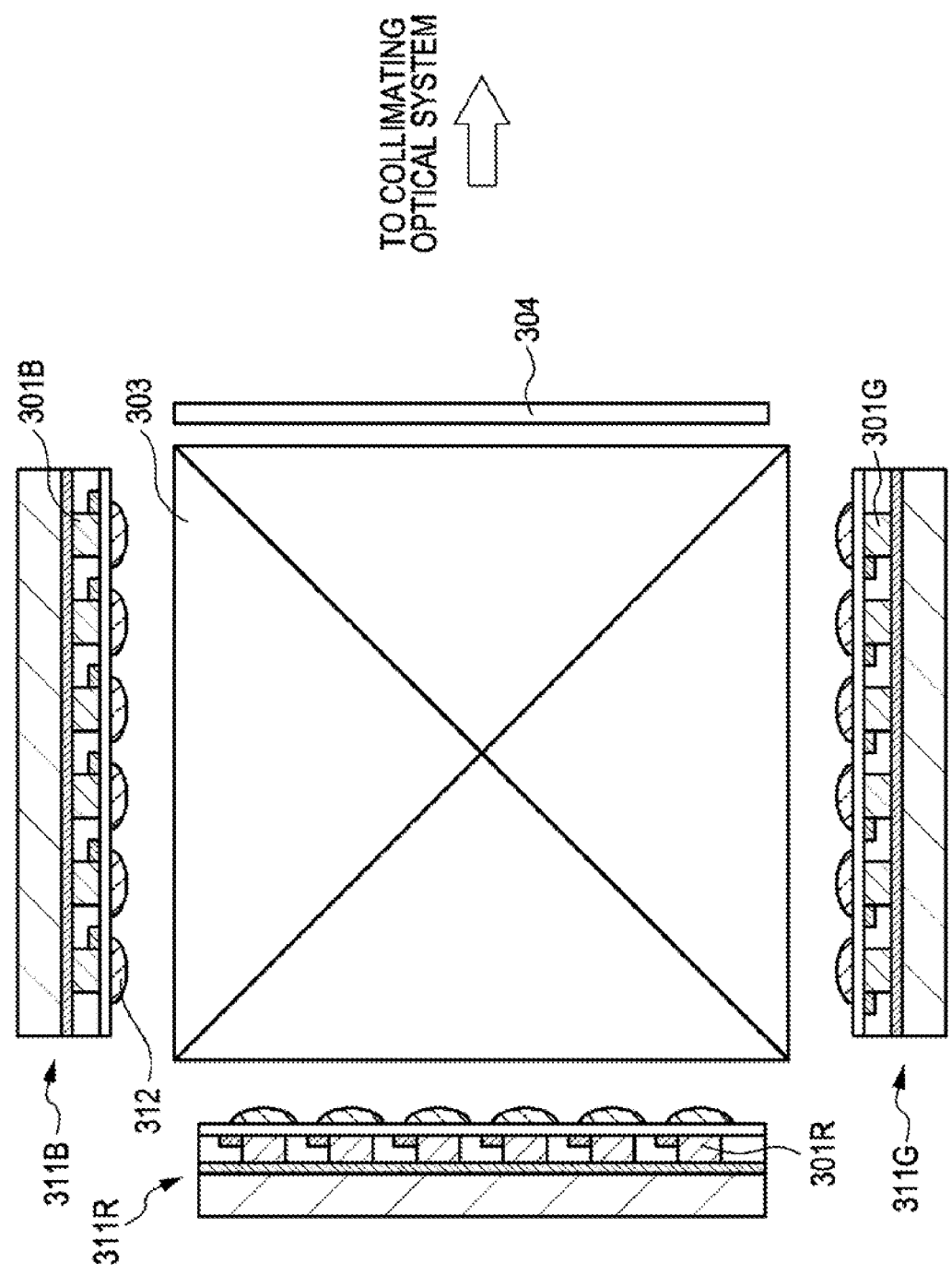
FIG. 10 is a conceptual diagram showing another modification of the exemplary image forming device.
Figure 11:
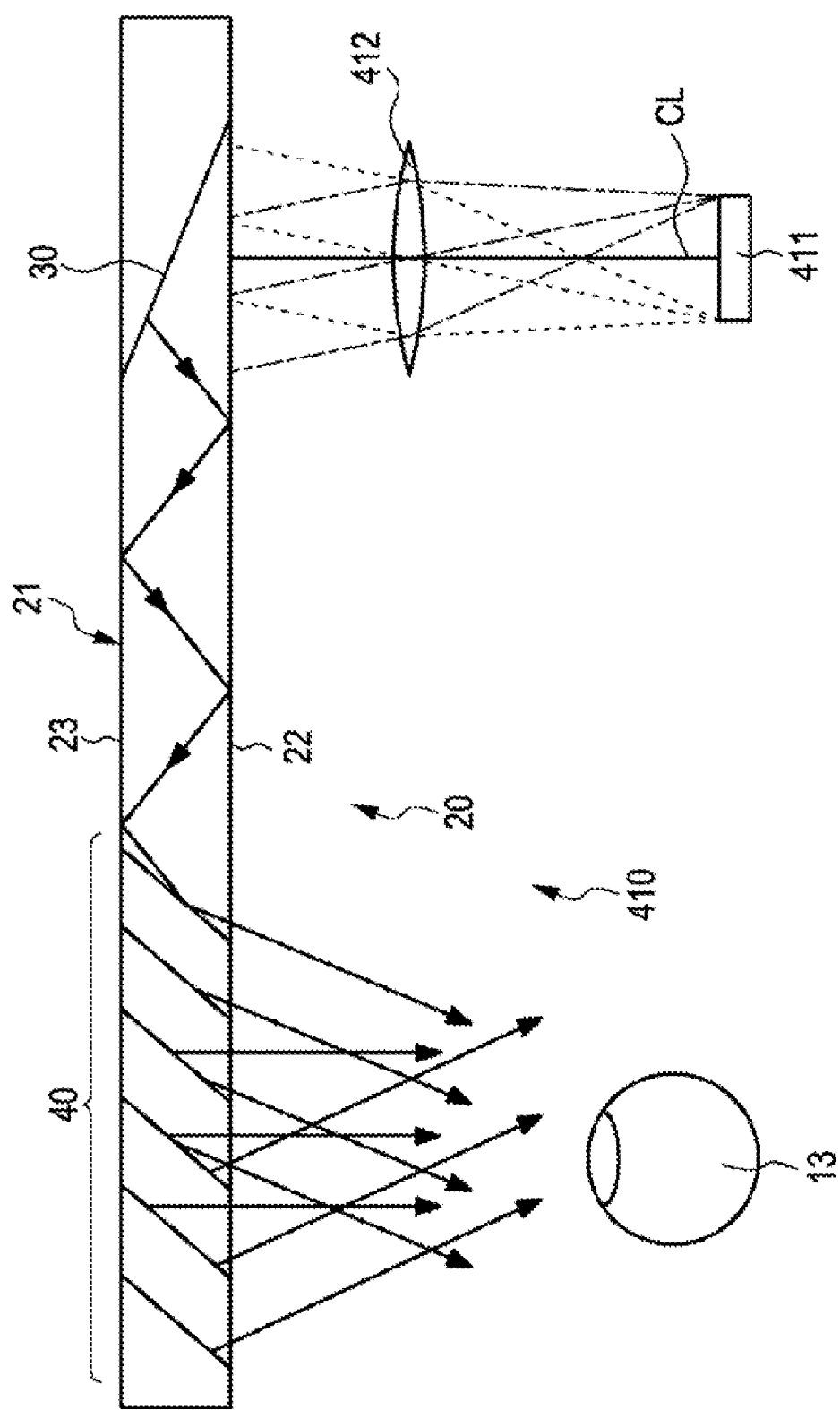
FIG. 11 is a conceptual diagram of a related-art image display apparatus.
Figure 12:
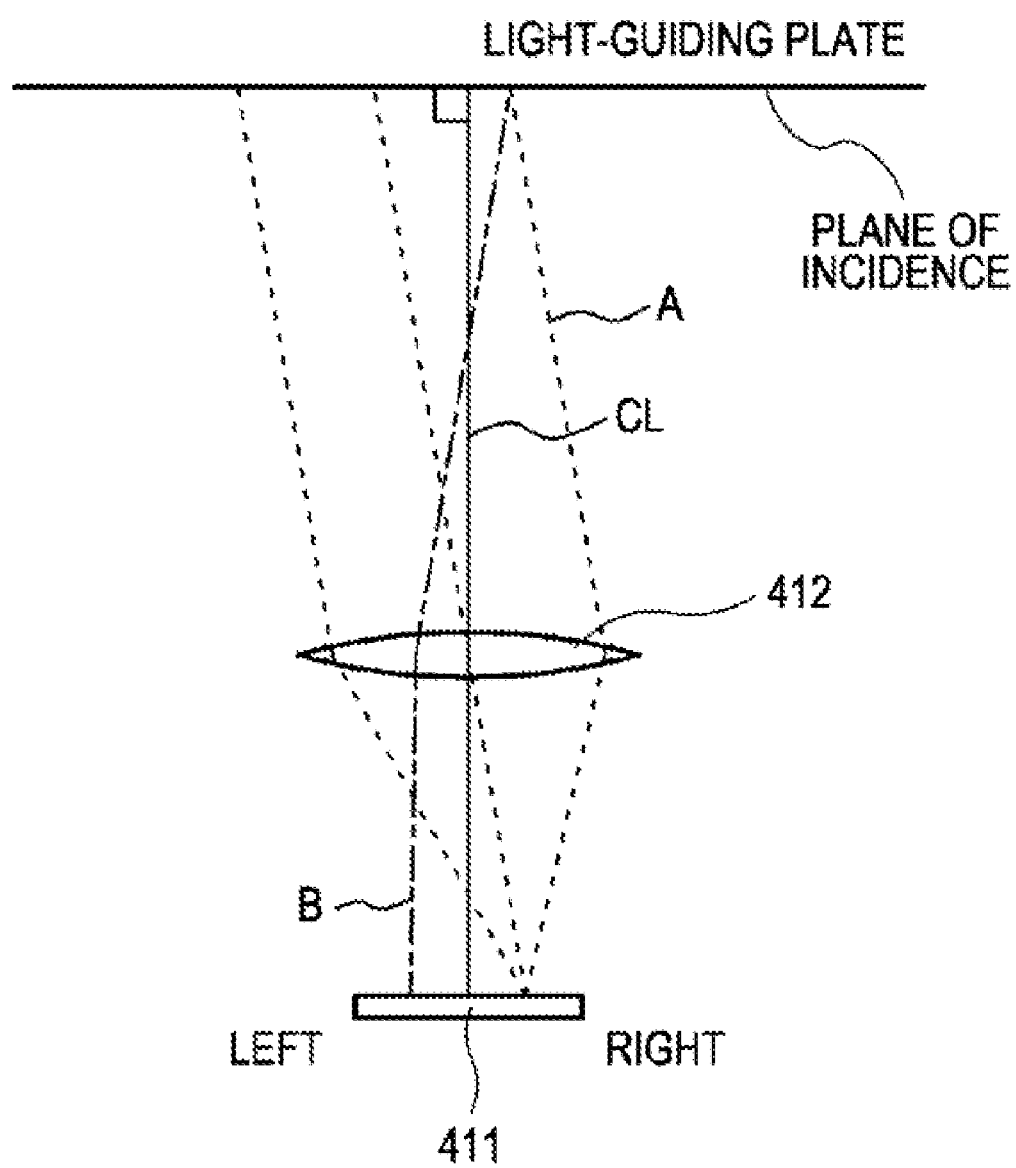
FIG. 12 schematically shows the behavior of light emitted from an image forming device, transmitted through a collimating optical system, and striking a light-guiding plate, in the related-art image display apparatus.

FIG. 10 is a conceptual diagram of another image forming device including the light-emitting panels 311R, 311G, and 311B having the light-emitting elements 301R, 301G, and 301B, respectively, arranged in a two-dimensional matrix, and so forth. The light emitted from the light-emitting panels 311R, 311G, and 311B enters the dichroic prism 303 and is integrated into light propagating along a single optical path. The integrated light output from the dichroic prism 303 is controlled by a light transmission controller 304 to be transmitted therethrough or to be blocked thereby. The light transmitted through the light transmission controller 304 is further transmitted through the collimating optical system 12 or 212 and is incident on the light-guiding plate 21.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An image display apparatus comprising:
an image forming device having a plurality of pixels;
a collimating optical system; and
an optical device configured to receive light, guide the light therethrough, and output the light,
wherein, when light emitted from a pixel located farthest from a center of the image forming device and passing through a nodal point of the collimating optical system near to the image forming device is incident on the collimating optical system at an angle of $\theta_1$, and when light emitted from a pixel located at the center of the image forming device and passing through the nodal point of the collimating optical system near to the image forming device is incident on the light-guiding plate at an angle of $\theta_2$, a condition of $\theta_2 > \theta_1$ is satisfied.

2. The image display apparatus according to claim 1, wherein the image forming device includes a reflective spatial light modulator and a light source.

3. The image display apparatus according to claim 2, wherein the reflective spatial light modulator includes a liquid crystal display and a polarization beam splitter, the polarization beam splitter reflecting a part of light emitted from the light source and guiding the part of light to the liquid crystal display while transmitting the part of light reflected by the liquid crystal display and guiding the part of light to the collimating optical system.

4. A head-mounted display comprising:
an image forming device having a plurality of pixels;
a collimating optical system; and
an optical device configured to receive light, guide the light therethrough, and output the light,
wherein, when light emitted from a pixel located farthest from a center of the image forming device and passing through a nodal point of the collimating optical system near to the image forming device is incident on the collimating optical system at an angle of $\theta_1$, and when light emitted from a pixel located at the center of the image forming device and passing through the nodal point of the collimating optical system near to the image forming device is incident on the light-guiding plate at an angle of $\theta_2$, a condition of $\theta_2 > \theta_1$ is satisfied.

* * * * *